US011892784B2

(12) United States Patent
Urayama

(10) Patent No.: US 11,892,784 B2
(45) Date of Patent: Feb. 6, 2024

(54) DEVELOPING DEVICE AND IMAGE FORMING APPARATUS

(71) Applicant: FUJIFILM Business Innovation Corp., Tokyo (JP)

(72) Inventor: Kenta Urayama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/871,973

(22) Filed: Jul. 24, 2022

(65) Prior Publication Data

US 2023/0288842 A1 Sep. 14, 2023

(30) Foreign Application Priority Data

Mar. 14, 2022 (JP) ................................. 2022-039589

(51) Int. Cl.
*G03G 15/08* (2006.01)

(52) U.S. Cl.
CPC ..... *G03G 15/0891* (2013.01); *G03G 15/0844* (2013.01)

(58) Field of Classification Search
CPC ............. G03G 15/0844; G03G 21/206; G03G 15/0887–0893
See application file for complete search history.

(56) References Cited

U.S. PATENT DOCUMENTS

2013/0170863 A1* 7/2013 Leemhuis .......... G03G 15/0886 399/258
2013/0343784 A1* 12/2013 Fujimura ........... G03G 15/0893 399/272
2018/0081299 A1* 3/2018 Okuno ............... G03G 15/0877
2020/0183325 A1* 6/2020 Park ................... G03G 15/0808
2020/0192247 A1* 6/2020 Park ................... G03G 15/0844
2021/0278802 A1* 9/2021 Jang ..................... G03G 21/206

FOREIGN PATENT DOCUMENTS

JP 2007102098 4/2007
JP 4587929 11/2010
JP 5067660 11/2012
JP 5743570 7/2015

* cited by examiner

*Primary Examiner* — Carla J Therrien
(74) *Attorney, Agent, or Firm* — JCIPRNET

(57) ABSTRACT

A developing device includes: a rotating member that passes a developer while rotating to an image holding body on which a latent image is formed; a housing in which a circulation path through which the developer to be supplied to the rotating member circulates and a branch path that is branched from the circulation path and through which a part of the developer is transported are formed; and a wall portion that forms the branch path at a part of the housing and in which an output port from which the developer is output to an outside and an exhaust port from which air in the branch path is output to the outside above the output port are formed.

20 Claims, 8 Drawing Sheets

DEVELOPING DEVICE AND IMAGE FORMING APPARATUS

CROSS-REFERENCE TO RELATED APPLICATIONS

This application is based on and claims priority under 35 USC 119 from Japanese Patent Application No. 2022-039589 filed Mar. 14, 2022.

BACKGROUND

(i) Technical Field

The present invention relates to a developing device and an image forming apparatus.

(ii) Related Art

A developing device described in JP2007-102098A includes a first developer output port that decreases, when a developer tank is inclined in one direction from a horizontal state, a developer output pace from the developer tank as compared with a horizontal state, and increases, when the developer tank is inclined in the other direction opposite to the one direction from the horizontal state, the developer output pace from the developer tank as compared with the horizontal state, a second developer output port that increases, when the developer tank is inclined in one direction from the horizontal state, a developer output pace from the developer tank as compared with the horizontal state, and decreases, when the developer tank is inclined in the other direction opposite to the one direction from the horizontal state, the developer output pace from the developer tank as compared with the horizontal state.

SUMMARY

In the related art, some developing devices are provided with an output port for outputting a surplus developer to an outside of the developing device. The output port is formed on a wall portion of a branch path branched from a circulation path through which the developer circulates in a housing. In a case where a developer surface in the branch path reaches a predetermined height, the developer is output from the output port.

On the other hand, in a case where the developing device is operated, a pressure inside the housing of the developing device is increased. Therefore, in order to suppress the pressure inside the housing from being increased, a through-hole that penetrates the inside and the outside is formed in the wall portion constituting the circulation path. Meanwhile, in the configuration in which the through-hole is formed only on the wall portion of the circulation path, the increase in the pressure of the branch path is not suppressed, and due to a difference between the pressure at the branch path and the pressure of the outside, the developer may be excessively output from the output port.

Aspects of non-limiting embodiments of the present disclosure relate to a developing device and an image forming apparatus that reduce, as compared with a case where a through-hole for suppressing a pressure inside a housing is formed only on a wall portion of a circulation path, a difference between a pressure of a branch path and a pressure of an outside during an operation of the developing device.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a developing device including: a rotating member that passes a developer while rotating to an image holding body on which a latent image is formed; a housing in which a circulation path through which the developer to be supplied to the rotating member circulates and a branch path that is branched from the circulation path and through which a part of the developer is transported are formed; and a wall portion that forms the branch path at a part of the housing and in which an output port from which the developer is output to an outside and an exhaust port from which air in the branch path is output to the outside above the output port are formed.

BRIEF DESCRIPTION OF THE DRAWINGS

Exemplary embodiment(s) of the present invention will be described in detail based on the following figures, wherein.

DETAILED DESCRIPTION

First Exemplary Embodiment

An example of a developing device and an image forming apparatus according to a first exemplary embodiment of the present disclosure will be described with reference to FIGS. 1 to 7. An arrow H illustrated in each diagram is a vertical direction and indicates an apparatus upward-downward direction, an arrow W is a horizontal direction and indicates an apparatus width direction, and an arrow D is the horizontal direction and indicates an apparatus depth direction.

Overall Configuration of Image Forming Apparatus

Figure 1:
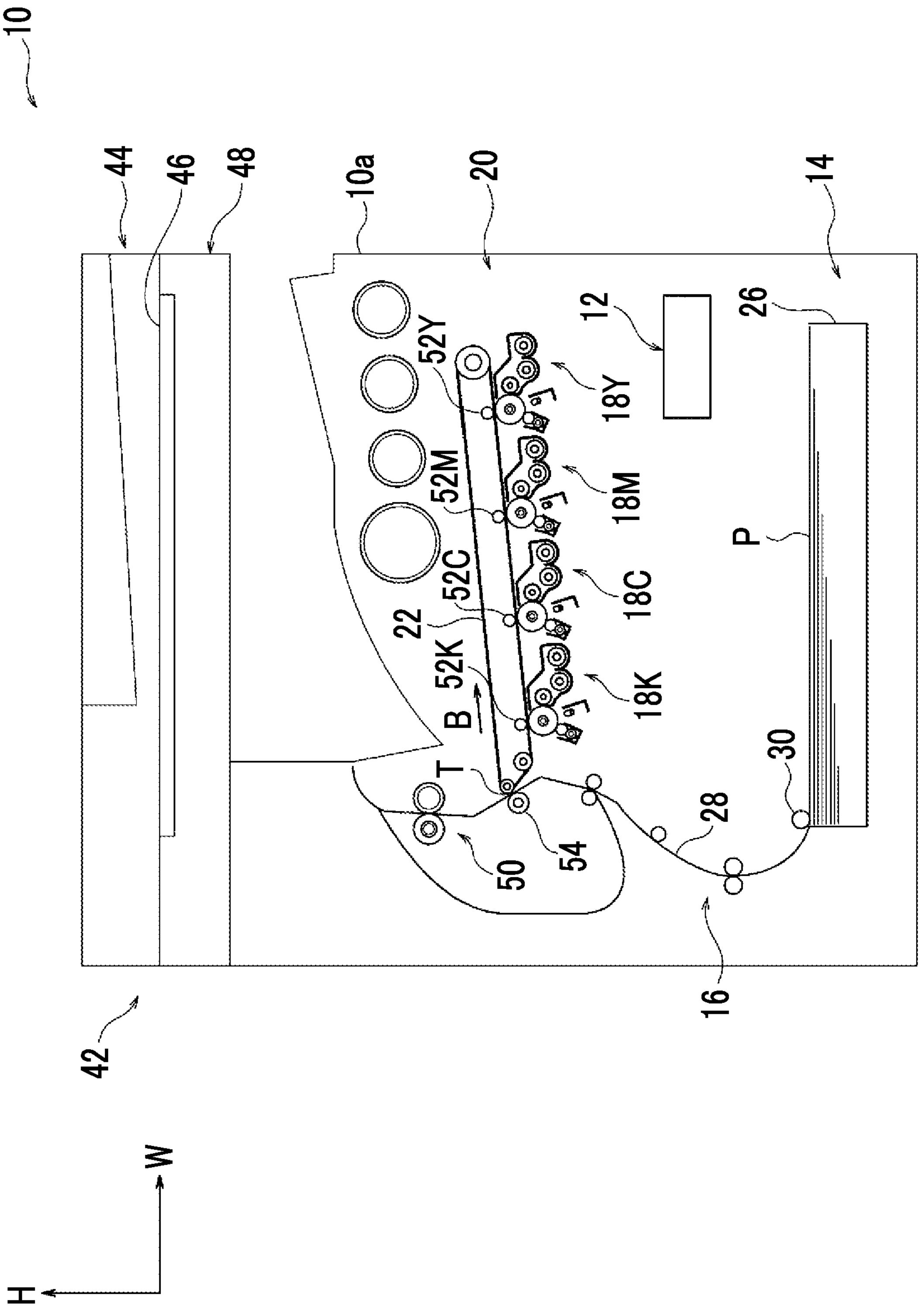
FIG. 1 is a schematic configuration diagram illustrating an image forming apparatus according to a first exemplary embodiment of the present disclosure.

As illustrated in FIG. 1, an image forming apparatus 10 includes a housing portion 14 in which a sheet member P as a recording medium is accommodated, and a transport portion 16 that transports the sheet member P as the recording medium accommodated in the housing portion 14. Further, the image forming apparatus 10 includes an image forming portion 20 that forms an image on the sheet member P to be transported, a document scanning portion 42 that scans a document, and a control portion 12 that controls each portion.

Housing Portion 14 and Transport Portion 16

As illustrated in FIG. 1, the housing portion 14 includes a housing member 26 that can be pulled out from an apparatus main body 10*a* of the image forming apparatus 10 toward a front side in the apparatus depth direction, and the sheet member P is loaded in the housing member 26. Further, the housing portion 14 includes a delivery roll 30 which delivers the sheet member P at the highest level loaded on the housing member 26 to a transport path 28 constituting the transport portion 16.

The transport portion 16 includes a plurality of transport rolls (reference numerals omitted) for transporting the sheet member P along the transport path 28 through which the sheet member P is transported.

Document Scanning Portion 42

As illustrated in FIG. 1, the document scanning portion 42 includes a document transport device 44 that automatically transports documents one by one, and a platen glass 46 which is disposed below the document transport device 44 and on which one document is placed. Further, the document scanning portion 42 includes a document scanning device 48 that scans a document transported by the document transport device 44 or a document placed on the platen glass 46.

Image Forming Portion 20

As illustrated in FIG. 1, the image forming portion 20 includes four image forming units 18Y, 18M, 18C, and 18K of yellow (Y), magenta (M), cyan (C), and black (K). The image forming units 18Y, 18M, 18C, and 18K are disposed side by side in the apparatus width direction. In the following description, in a case where it is not necessary to distinguish Y, M, C, and K, Y, M, C, and K may be omitted.

Figure 2:
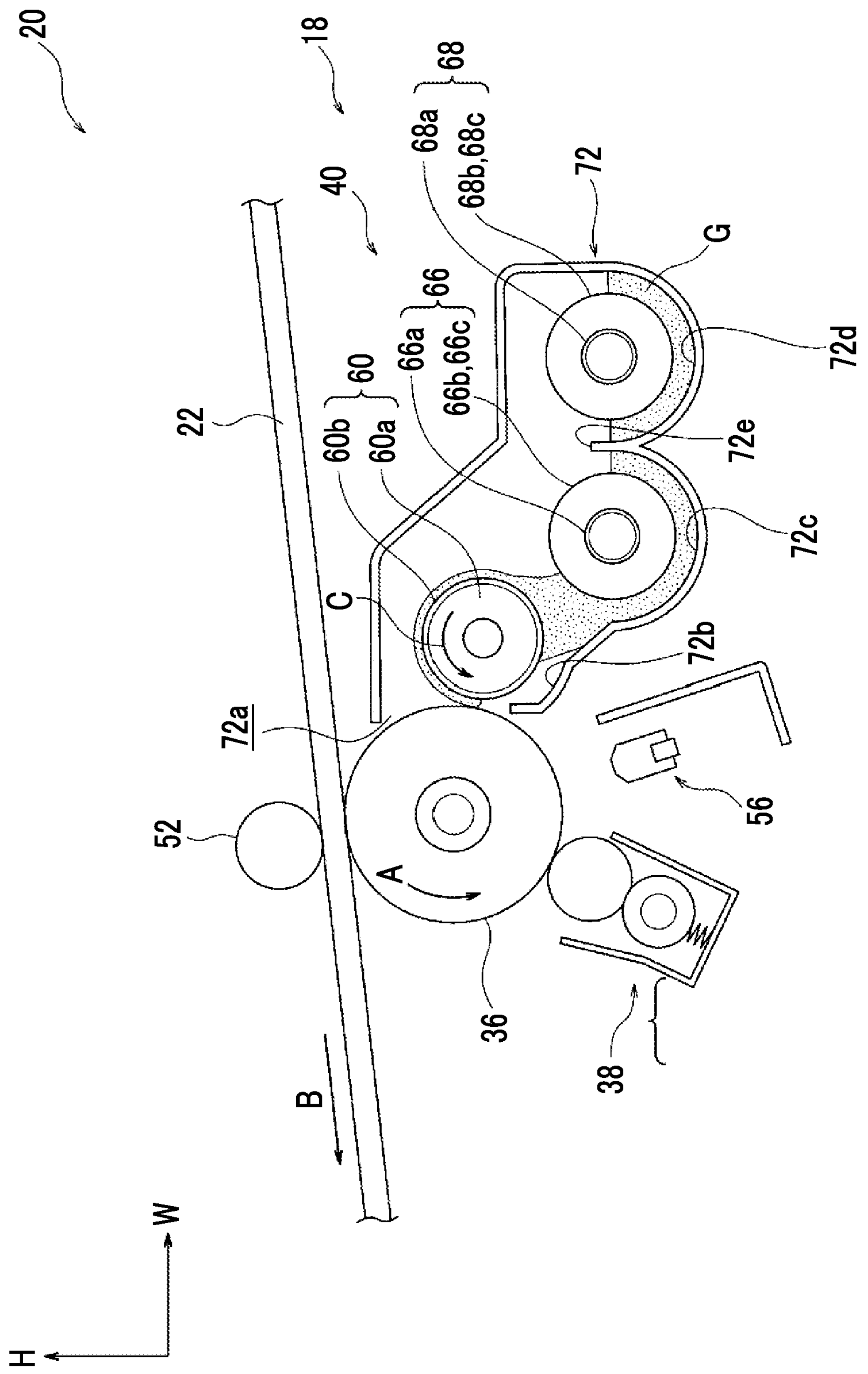
FIG. 2 is a schematic configuration diagram illustrating an image forming unit of the image forming apparatus according to the first exemplary embodiment of the present disclosure.

The image forming unit 18 of each color is detachable from the apparatus main body 10*a*. As illustrated in FIG. 2, the image forming unit 18 of each color includes an image holding body 36 that rotates in a direction of an arrow A in FIG. 2, and a charging member 38 that charges a surface of the image holding body 36. Further, the image forming unit 18 includes an exposure device 56 that irradiates the charged image holding body 36 with exposure light, and a developing device 40 that develops an electrostatic latent image formed by emitting the exposure light to visualize the electrostatic latent image as a toner image. Details of the developing device 40 will be described below.

Further, as illustrated in FIG. 1, the image forming portion 20 has an endless transfer belt 22 that orbits in a direction of an arrow B in FIG. 1 and a primary transfer roll 52 (see FIG. 2) that transfers the toner image formed by the image forming unit 18 of each color to the transfer belt 22.

Further, the image forming portion 20 includes a secondary transfer roll 54 which transfers the toner image transferred to the transfer belt 22 to the sheet member P, and a fixing device 50 heats and pressurizes the sheet member P onto which the toner image is transferred to fix the toner image to the sheet member P.

Action of Image Forming Apparatus

With the image forming apparatus 10, an image is formed as follows.

First, the charging member 38 illustrated in FIG. 2 uniformly and negatively charges the surface of the rotating image holding body 36 of each color at a predetermined potential. Subsequently, the exposure device 56 irradiates the surface of the charged image holding body 36 of each color with exposure light based on image data scanned by the document scanning portion 42 (see FIG. 1) to form an electrostatic latent image.

Therefore, the electrostatic latent image corresponding to the image data is formed on the surface of the image holding body 36 of each color. Further, the developing device 40 for each color develops this electrostatic latent image, and visualizes the electrostatic latent image as a toner image. Further, the toner image formed on the surface of the image holding body 36 of each color is sequentially transferred to the transfer belt 22 by the primary transfer roll 52.

Therefore, as illustrated in FIG. 1, the sheet member P delivered from the housing member 26 to the transport path 28 by the delivery roll 30 is delivered to a transfer position T at which the transfer belt 22 and the secondary transfer roll 54 come into contact with each other. At the transfer position T, the sheet member P is transported between the transfer belt 22 and the secondary transfer roll 54, so that the toner image on the transfer belt 22 is transferred to the sheet member P.

Further, the fixing device 50 fixes the toner image transferred to the sheet member P to the sheet member P. Then, the sheet member P on which the toner image is fixed is output to an outside of the apparatus main body 10*a*.

Central Portion Configuration

Next, the developing device 40 will be described. As illustrated in FIG. 2, the developing device 40 includes a housing 72, a developing roll 60 disposed to face the image holding body 36, a supply auger 66 for supplying a developer G to the developing roll 60, and an agitating auger 68 for agitating the developer G. The developing roll 60 is an example of a rotating member.

The developer G is a two-component developer including toner T and magnetic carrier particles (hereinafter, referred to as "carrier C") as main components.

Housing 72

As illustrated in FIG. 2, the housing 72 is disposed on one side of the image holding body 36 in the apparatus width direction. An opening portion 72*a* that opens an inside of the housing 72 is formed to extend in the apparatus depth direction at a portion of the housing 72 facing the image holding body 36.

In addition, in the housing 72, a delivery path 72*b* in which the developing roll 60 is disposed is formed to extend in the apparatus depth direction, on an opposite side of the image holding body 36 with the opening portion 72*a* interposed therebetween. Further, in the housing 72, a supply path 72*c* in which the supply auger 66 is disposed is formed to extend diagonally below the delivery path 72*b* in the apparatus depth direction. In addition, in the housing 72, an agitating path 72*d* in which the agitating auger 68 is disposed is formed on one side of the supply path 72*c* in the apparatus width direction so as to extend in the apparatus depth direction. Further, in the housing 72, a partition wall 72*e* that separates the supply path 72*c* and the agitating path 72*d* is formed between the supply path 72*c* and the agitating path 72*d*.

Figure 3:
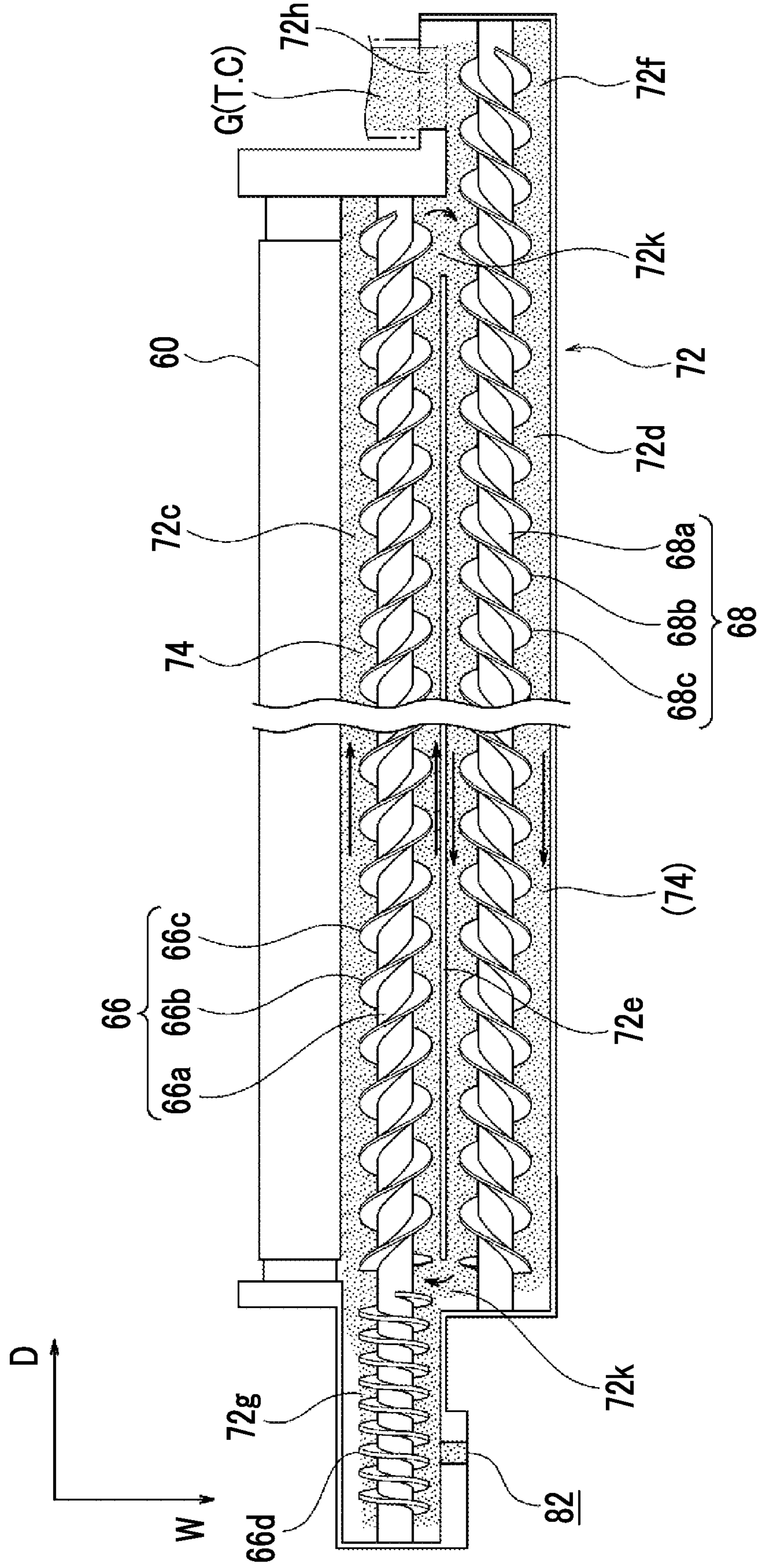
FIG. 3 is a plan view illustrating an inside of a developing device according to the first exemplary embodiment of the present disclosure.

Further, as illustrated in FIG. 3, in the housing 72, a distribution path 72*f* for distributing the toner T and the carrier C to the developing device 40 is formed on a depth side (right side in FIG. 3) in the apparatus depth direction with respect to the agitating path 72*d*. The distribution path 72*f* is formed by extending the agitating path 72*d* to the depth side in the apparatus depth direction. A portion on the end portion side of the agitating auger 68 is disposed in the distribution path 72*f*. That is, the agitating auger 68 is disposed so as to straddle the agitating path 72*d* and the distribution path 72*f*.

Further, in the housing 72, an output path 72*g* for outputting the developer G from the housing 72 is formed on a front side (left side in FIG. 3) in the apparatus depth direction with respect to the supply path 72*c*. The output path 72*g* is formed by extending the supply path 72*c* toward the front side in the apparatus depth direction. A portion on an end portion side of the supply auger 66 is disposed in the output path 72*g*. That is, the supply auger 66 is disposed so as to straddle the supply path 72*c* and the output path 72*g*. The output path 72*g* is an example of a branch path.

Supply Path 72*c*, Agitating Path 72*d*, Partition Wall 72*e*

As illustrated in FIG. 2, the supply path 72*c* and the agitating path 72*d* have a U-shaped cross-section shape. Further, the partition wall 72*e* extends upward as viewed from the apparatus depth direction, and as illustrated in FIG. 3, the supply path 72*c* and the agitating path 72*d* are separated from each other except for a portion of the supply path 72*c* on the depth side in the apparatus depth direction and a portion of the supply path 72*c* on the front side in the apparatus depth direction. Then, in the housing 72, a communication path 72*k* connecting the supply path 72*c* and the agitating path 72*d* is formed at a portion of the supply path 72*c* on the depth side in the apparatus depth direction and a portion of the supply path 72*c* on the front side in the apparatus depth direction.

Distribution Path 72*f*

As described above, the distribution path 72*f* is formed by extending the agitating path 72*d* toward the depth side in the apparatus depth direction. Further, as illustrated in FIG. 3, in the housing 72, a distribution port 72*h* for distributing the developer G to the distribution path 72*f* is formed on a wall portion forming the distribution path 72*f*.

In this configuration, the developer G distributed to the developing device 40 flows into the distribution path 72*f* through the distribution port 72*h*.

Output Path 72*g*

Figure 4:
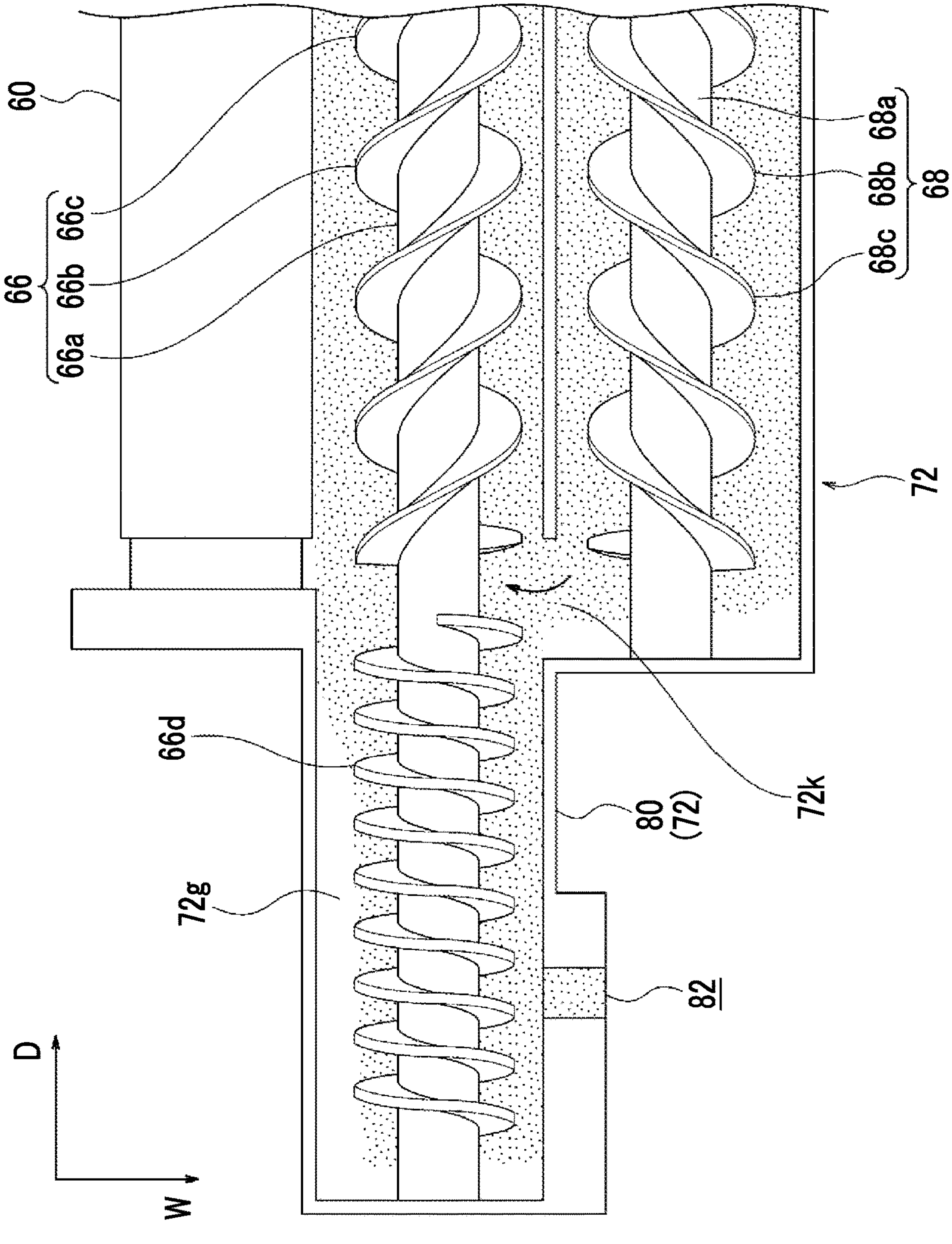
FIG. 4 is an enlarged plan view illustrating the inside of the developing device according to the first exemplary embodiment of the present disclosure.

As described above, the output path 72*g* is formed by extending the supply path 72*c* toward the front side in the apparatus depth direction. Further, as illustrated in FIG. 4, in the housing 72, a wall portion 80 forming the output path 72*g* is formed with an output port 82 for outputting the developer G to an outside. Details of the output port 82 will be described below.

In this configuration, the developer G output from the developing device 40 is output to the outside of the developing device 40 through the output port 82.

Developing Roll 60

The developing roll 60 is disposed in the delivery path 72*b* as illustrated in FIG. 2. Further, a gap (development gap) for passing the developer G from the developing roll 60 to the image holding body 36 is formed between the developing roll 60 and the image holding body 36.

The developing roll 60 includes a magnet roll 60*a* having a circular cross-section shape and a rotary sleeve 60*b* that is placed on the magnet roll 60*a* and rotates around the magnet roll 60*a*. A rotational force is transmitted from a drive source (not illustrated), so that the rotary sleeve 60*b* rotates in a direction of an arrow C (counterclockwise direction) in FIG. 2.

Supply Auger 66

As illustrated in FIG. 3, the supply auger 66 is disposed so as to straddle the supply path 72*c* and the output path 72*g*. The supply auger 66 includes a supply shaft 66*a* extending in the apparatus depth direction, and two spiral supply blades 66*b* and 66*c* and a spiral blade portion 66*d* formed on an outer peripheral surface of the supply shaft 66*a*.

The supply blades 66*b* and 66*c* are arranged on a depth side in the apparatus depth direction of the communication path 72*k* on the front side in the apparatus depth direction, and the blade portion 66*d* is disposed on a front side in the apparatus depth direction of the communication path 72*k* on the front side in the apparatus depth direction. That is, the two supply blades 66*b* and 66*c* are formed in a portion of the supply shaft 66*a* disposed in the supply path 72*c*.

As illustrated in FIGS. 3 and 4, the blade portion 66*d* is formed at a portion of the supply shaft 66*a* disposed in the output path 72*g*, and has a winding direction having a spiral shape in a direction opposite to the supply blades 66*b* and 66*c*.

Both end portions of the supply shaft 66*a* are rotatably supported by the wall portion of the housing 72, and a gear (not illustrated) to which the rotational force is transmitted from the drive source is fixed to one end portion of the supply shaft 66*a*.

In this configuration, the supply auger 66 of a portion at which the supply blades 66*b* and 66*c* are formed rotates, and agitates the developer G in the supply path 72*c* and transports the developer G from the front side (left side FIGS. 3 and 4) in the apparatus depth direction to the depth side (right side in FIGS. 3 and 4) in the apparatus depth direction to supply the developer G to the developing roll 60. Further, the supply auger 66 of the portion at which the supply blades 66*b* and 66*c* are formed passes the developer G to the agitating auger 68 through the communication path 72*k* on the depth side in the apparatus depth direction.

On the other hand, the supply auger 66 of a portion at which the blade portion 66*d* is formed is passed from the agitating auger 68 to the supply auger 66 through the communication path 72*k* on the front side in the apparatus depth direction, and transports the developer G which becomes surplus from the depth side in the apparatus depth direction to the front side in the apparatus depth direction. Then, the transported developer G is output to the outside of the developing device 40 through the output port 82.

Agitating Auger 68

As illustrated in FIG. 3, the agitating auger 68 is disposed so as to straddle the agitating path 72*d* and the distribution path 72*f*. The agitating auger 68 includes an agitating shaft 68*a* extending in the apparatus depth direction and two spiral agitating blades 68*b* and 68*c* formed on an outer peripheral surface of the agitating shaft 68*a*.

Both end portions of the agitating shaft 68*a* are rotatably supported by the wall portion of the housing 72, and a gear (not illustrated) to which the rotational force is transmitted from the drive source is fixed to one end portion of the agitating shaft 68*a*.

In this configuration, the agitating auger 68 of a portion at which the agitating blades 68*b* and 68*c* are formed agitates and transports the toner T flowing from the distribution path 72*f* into the agitating path 72*d* and the developer G passed from the supply auger 66 through the communication path 72*k* on the depth side in the apparatus depth direction. Specifically, the agitating auger 68 of the portion at which the agitating blades 68*b* and 68*c* are formed transports the developer G from the depth side in the apparatus depth direction (right side in FIG. 3) to the front side in the apparatus depth direction (left side in FIG. 3) to the supply auger 66 through the communication path 72*k* on the front side in the apparatus depth direction while agitating the developer G.

In this manner, the developer G circulates between the supply path 72*c* and the agitating path 72*d* (see arrows in FIG. 3). A circulation path 74 is formed by the supply path 72*c* and the agitating path 72*d*.

Further, in the housing 72 of the portion forming the circulation path 74, a through-hole (not illustrated) is formed so as to reduce a difference between a pressure inside the housing 72 and a pressure outside the housing 72. Here, since the through-hole that reduces the difference between the internal pressure and the external pressure of the housing 72 is not a through-hole that outputs the transported developer G to the outside, the through-hole is formed at a position above a surface of the developer G without coming into contact with the surface of the developer G.

Action of Developing Device 40

Next, an action of the developing device 40 will be described.

Inside the housing 72 of the developing device 40, the rotating supply auger 66 and agitating auger 68 circulate between the supply path 72*c* and the agitating path 72*d* while agitating the developer G, as illustrated in FIG. 3 (see the arrows in FIG. 3). By the developer G being agitated, the toner T and the carrier C of the developer G rub against each other, and the toner T is triboelectrically charged to a predetermined polarity.

Then, as illustrated in FIG. 2, the supply auger 66 supplies the developer G to the developing roll 60. The developer G supplied to the developing roll 60 is held in a state in which a magnetic brush (not illustrated) is formed on a surface of the developing roll 60 by a magnetic force of the magnet roll 60*a*. Then, the rotating rotary sleeve 60*b* transports the developer G.

The rotating rotary sleeve 60*b* transports the developer G to a position facing the image holding body 36. Then, the toner T included in the developer G transported to the position facing the image holding body 36 adheres to an electrostatic latent image formed on the image holding body 36, and the electrostatic latent image is visualized as a toner image.

In this manner, in a case where the control portion 12 (see FIG. 1) receives from a detection section (not illustrated) that the toner T of the developer G circulating between the supply path 72*c* and the agitating path 72*d* is decreased, the control portion 12 flows the toner T accommodated in a housing portion (not illustrated) into the distribution path 72*f* through the distribution port 72*h* (see FIG. 3).

On the other hand, as illustrated in FIG. 4, the blade portion 66*d* of the rotating supply auger 66 transports the developer G inside the housing 72 of the developing device 40, which is the developer G surplus with respect to a predetermined amount. Specifically, the blade portion 66*d* of the rotating supply auger 66 transports the surplus developer G delivered from the agitating auger 68 through the communication path 72*k*, from the depth side in the apparatus depth direction to the front side in the apparatus depth direction along the output path 72*g*. Then, the developer G transported by the blade portion 66*d* is output to the outside of the developing device 40 through the output port 82.

Here, the output path 72*g* in which the output port 82 and the like are formed will be described in detail.

Specific Configuration of Output Path 72*g*

As illustrated in FIG. 3, the output path 72*g* is formed to be branched from the circulation path 74 formed by the supply path 72*c* and the agitating path 72*d*. Specifically, the output path 72*g* is formed at a portion opposite to the circulation path 74 with respect to the communication path 72*k* on the front side in the apparatus depth direction connecting the supply path 72*c* and the agitating path 72*d*.

Further, as illustrated in FIG. 4, the output port 82 for outputting the surplus developer G to the outside and an exhaust port 92 (see FIG. 5) for exhausting air inside the housing 72 to the outside are formed at the wall portion 80, which forms the output path 72*g* and is a part of the housing 72.

Figure 5:
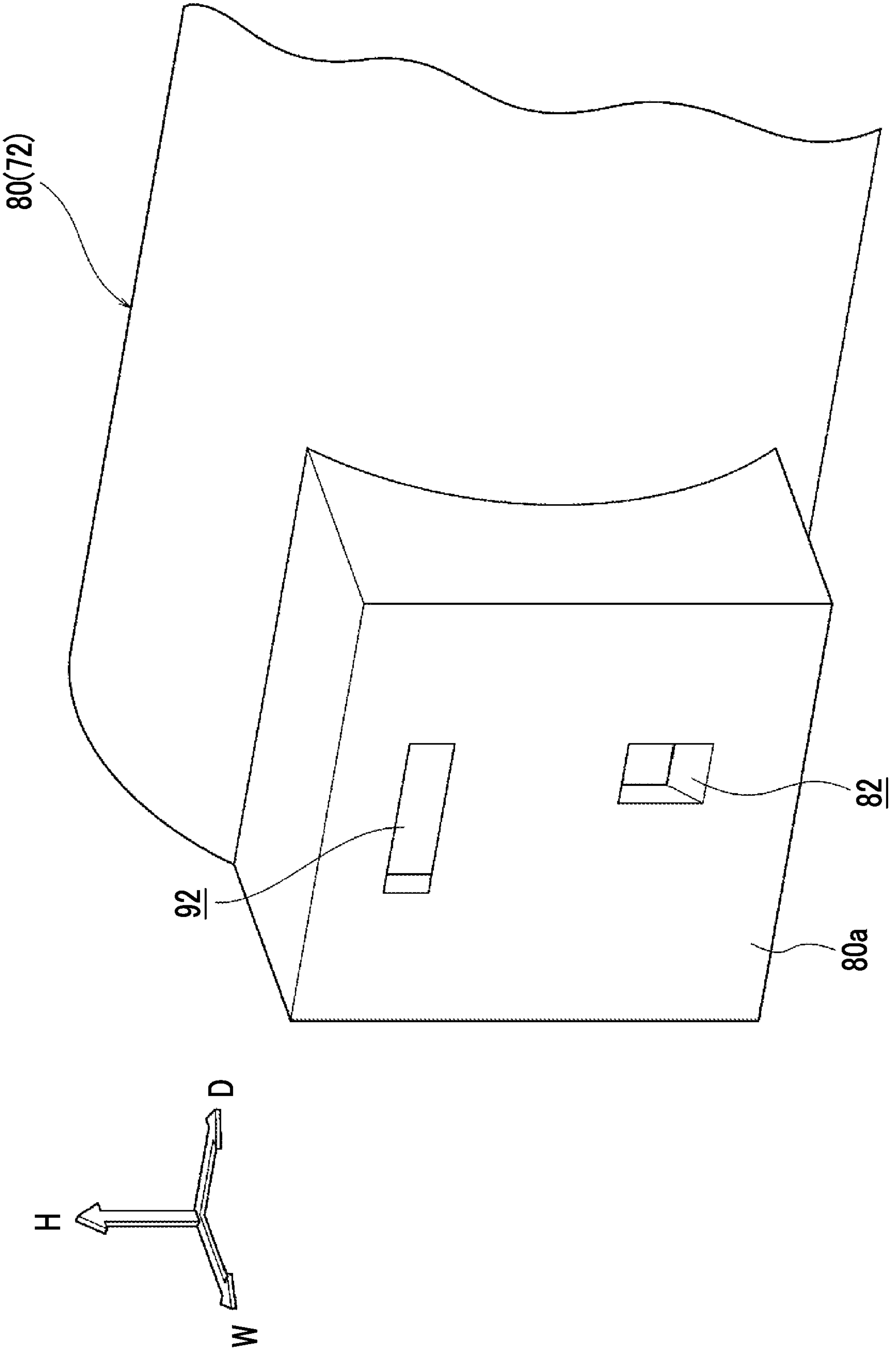
FIG. 5 is a perspective view of an output path of the developing device according to the first exemplary embodiment of the present disclosure as viewed from an outside.
Figure 6:
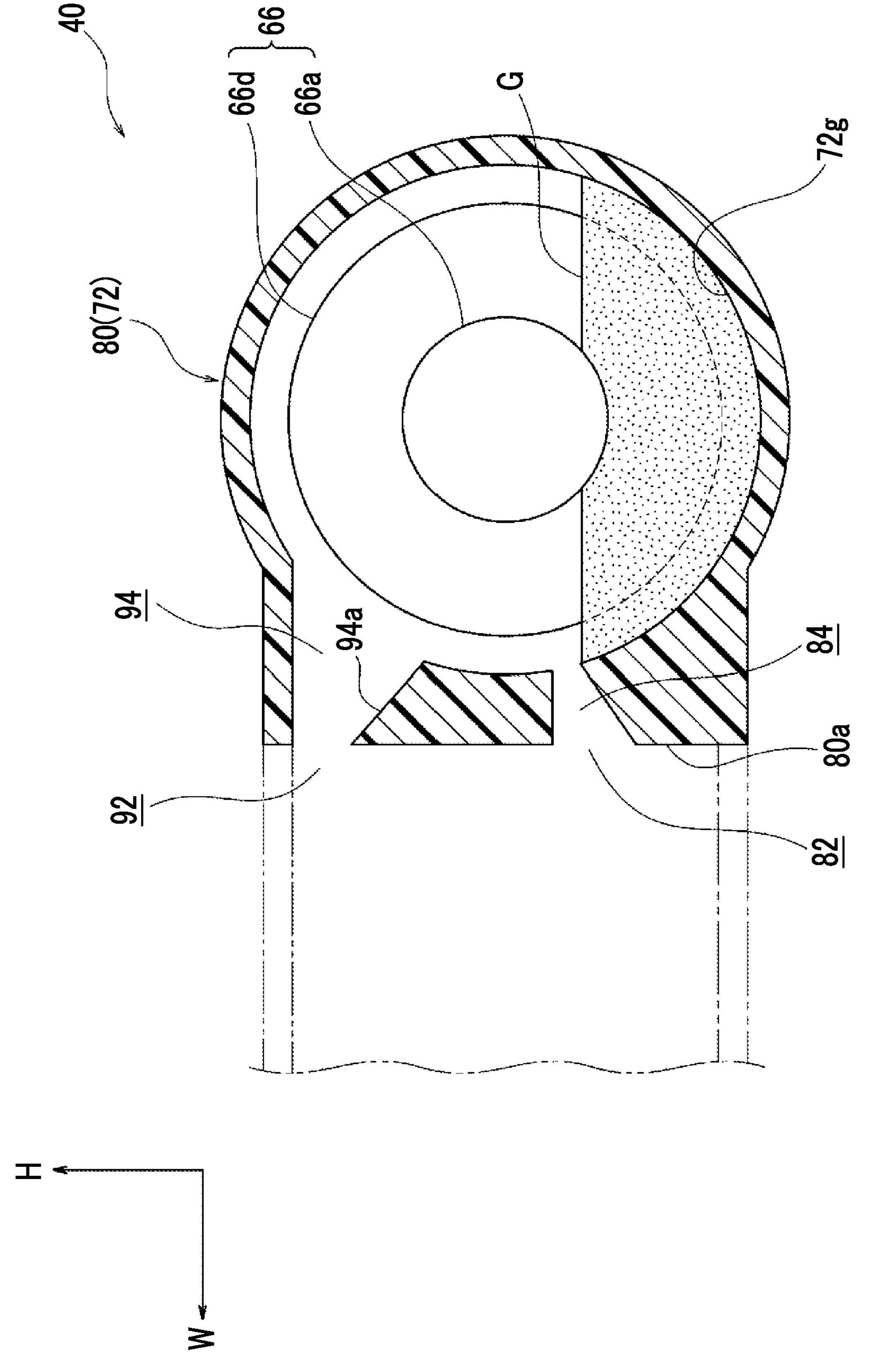
FIG. 6 is a cross-sectional view of the output path of the developing device according to the first exemplary embodiment of the present disclosure.

Specifically, the wall portion 80 has a cylindrical shape extending in the depth direction, and as illustrated in FIGS. 5 and 6, a flat surface portion 80*a* which projects to one side in the apparatus width direction and faces one side in the apparatus width direction is formed at the wall portion 80. The output port 82 and the exhaust port 92 are formed on the flat surface portion 80*a*.

Output Port 82

As illustrated in FIG. 5, the output port 82 is disposed in a lower portion of the flat surface portion 80*a*, and has a rectangular shape extending in an apparatus upward-downward direction as viewed from the apparatus width direction. Further, as illustrated in FIG. 6, an output path 84 that guides the surplus developer G from the inside of the housing 72 to the output port 82 is formed at the wall portion 80. The output path 84 gradually expands from the inside of the housing 72 to the outside.

With this configuration, in a case where the surface of the developer G in the output path 72*g* reaches a predetermined height, the surplus developer G is output from the output port 82 through the output path 84.

Exhaust Port 92

As illustrated in FIG. 5, the exhaust port 92 is disposed in an upper portion of the flat surface portion 80*a*, and has a rectangular shape extending in the apparatus depth direction as viewed from the apparatus width direction. The exhaust port 92 is formed to exhaust the air inside the housing 72 to the outside.

Further, as illustrated in FIG. 6, an exhaust path 94 that guides the air from the inside of the housing 72 to the exhaust port 92 is formed at the wall portion 80. The exhaust path 94 is gradually narrowed from the inside to the outside of the housing 72. Further, a bottom surface 94*a* constituting the exhaust path 94 is inclined in the horizontal direction such that the exhaust port side portion of the output path 72*g* is located above the output path side portion of the output path 72*g*.

With this configuration, in a case where the developing device 40 operates, the pressure inside the housing 72 is increased. In a case where the pressure inside the housing 72 is higher than the outside, the pressure in the output path 72*g* constituting a part of the housing 72 is also higher than the outside. Therefore, the developer G may be excessively output from the output port 82 due to a difference between the pressure of the output path 72*g* and the pressure of the outside. Meanwhile, the exhaust port 92 that exhausts the air inside the housing 72 to the outside suppresses the difference between the pressure of the output path 72*g* and the pressure of the outside.

Relative Relationship between Output Port 82 and Exhaust Port 92

Figure 7:
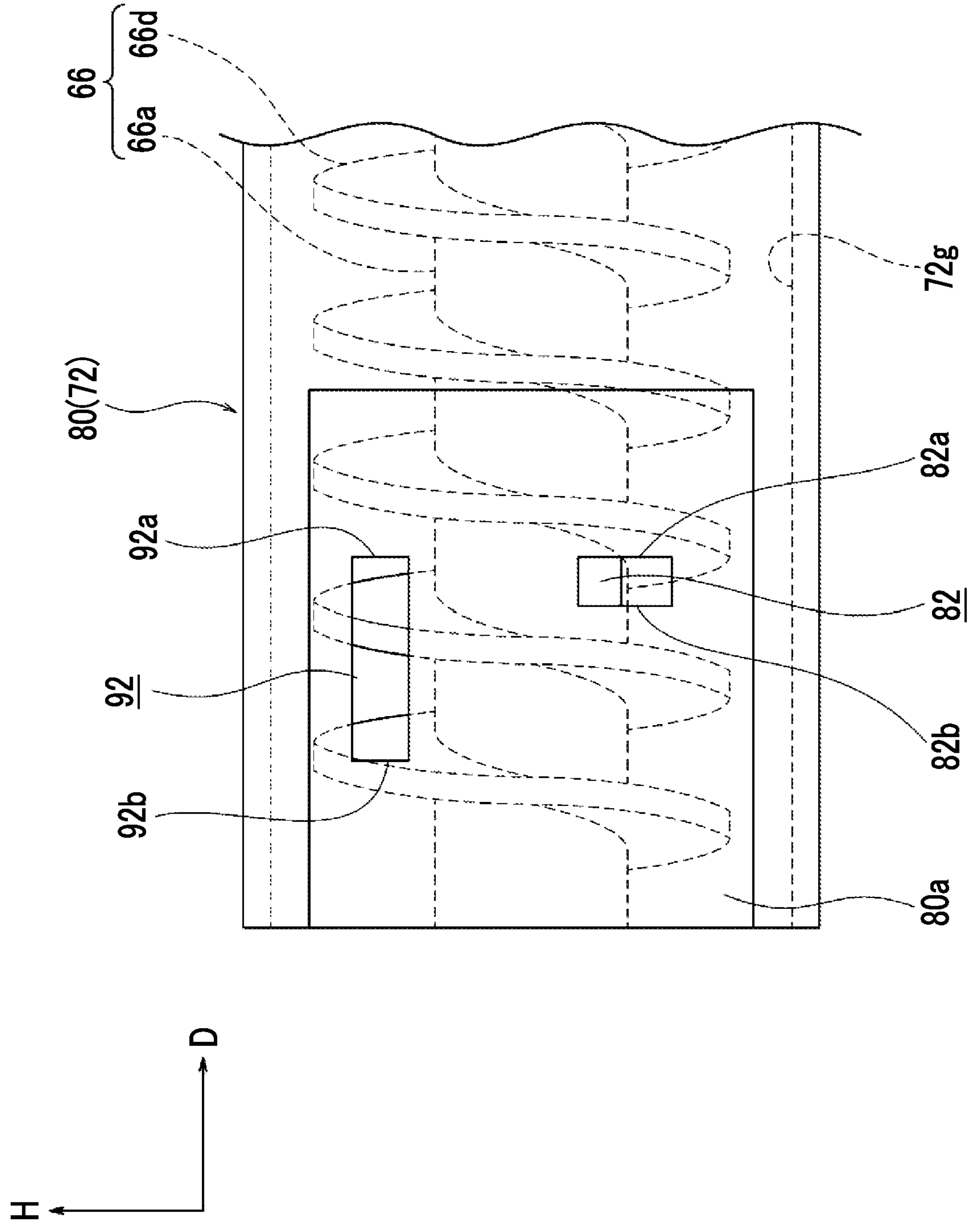
FIG. 7 is a side view of the output path of the developing device according to the first exemplary embodiment of the present disclosure as viewed from the outside.

Next, a relative relationship between the output port 82 and the exhaust port 92 will be described. FIG. 7 illustrates the flat surface portion 80*a* as viewed from the apparatus width direction. In FIG. 7, the developer G in the output path 72*g* is transported from the right side to the left side.

An end portion 82*a* on the upstream side in a transport direction of the developer G at the output port 82 and an end portion 92*a* on the upstream side in the transport direction of the developer G at the exhaust port 92 are disposed at the same position in the apparatus depth direction.

Further, an end portion 92*b* on the downstream side in the transport direction of the developer G in the exhaust port 92 is located on the downstream side in the transport direction of the developer G, as compared with an end portion 82*b* on the downstream side in the transport direction of the developer G in the output port 82. In other words, an entirety of the output port 82 overlaps with the exhaust port 92, in the transport direction of the developer G. Further, the exhaust port 92 is provided with an extending portion on the downstream side with respect to the downstream end of the output port 82, in the transport direction of the developer G.

Further, an opening area of the exhaust port 92 is larger than an opening area of the output port 82.

In this configuration, in a case where the developing device 40 operates and the pressure in the output path 72*g* becomes higher than the pressure in the outside, air in the output path 72*g* is output from the exhaust port 92 to the outside through the exhaust path 94. As a result, the difference between the pressure of the output path 72*g* and the pressure of the outside becomes small. Further, by reducing the difference between the pressure of the output path 72*g* and the pressure of the outside, it is possible to suppress the developer G from being excessively output from the output port 82.

Summary

As described above, in the developing device 40, the exhaust port 92 is formed on the wall portion 80 constituting the output path 72*g*. Therefore, the difference between the pressure of the output path 72*g* and the pressure of the outside during the operation of the developing device 40 is reduced, as compared with the case where the through-hole for suppressing the pressure inside the housing from increasing is formed only on the wall portion of the circulation path.

Further, with the developing device 40, the difference between the pressure of the output path 72*g* and the pressure of the outside during the operation of the developing device 40 is reduced, so that the excessive output of the developer G from the output port 82 is suppressed.

Further, in the developing device 40, the entirety of the output port 82 overlaps with the exhaust port 92 in the transport direction of the developer G. Therefore, the difference between the pressure of the output path 72*g* in the vicinity of the output port 82 and the pressure of the outside is reduced, as compared with the case where only a part of the output port overlaps with the exhaust port, in the transport direction of the developer G.

Further, in the developing device 40, the exhaust port 92 is provided with the extending portion on the downstream side with respect to the downstream end of the output port 82, in the transport direction of the developer G. Therefore, the developer G floating in the output path 72*g* is suppressed from being output from the exhaust port 92, as compared with the case where the exhaust port is provided with an extension portion on the upstream side with respect to the upstream end of the output port.

Further, in the developing device 40, the bottom surface 94*a* constituting the exhaust path 94 is inclined in the horizontal direction so that the exhaust port side portion is located above the output path side portion. Therefore, most of the developer G on the bottom surface 94*a* is returned to the output path 72*g*, as compared with the case where the bottom surface is provided along the horizontal direction.

Further, in the developing device 40, the opening area of the exhaust port 92 is larger than the opening area of the output port 82. Therefore, the difference between the pressure of the output path 72*g* and the pressure of the outside during the operation of the developing device 40 is reduced, as compared with the case where the opening area of the exhaust port is smaller than the opening area of the output port.

Further, in the image forming apparatus 10, the developer G is suppressed from being excessively output from the output port 82, so that concentration unevenness that occurs in the toner image is suppressed, as compared with the case where the developing device is provided in which the through-hole is formed only on the wall portion of the circulation path to suppress the pressure inside the housing from increasing.

Second Exemplary Embodiment

An example of a developing device and an image forming apparatus according to a second exemplary embodiment of the present disclosure will be described with reference to FIG. 8. A part of the second exemplary embodiment different from the first exemplary embodiment will be mostly described.

Figure 8:
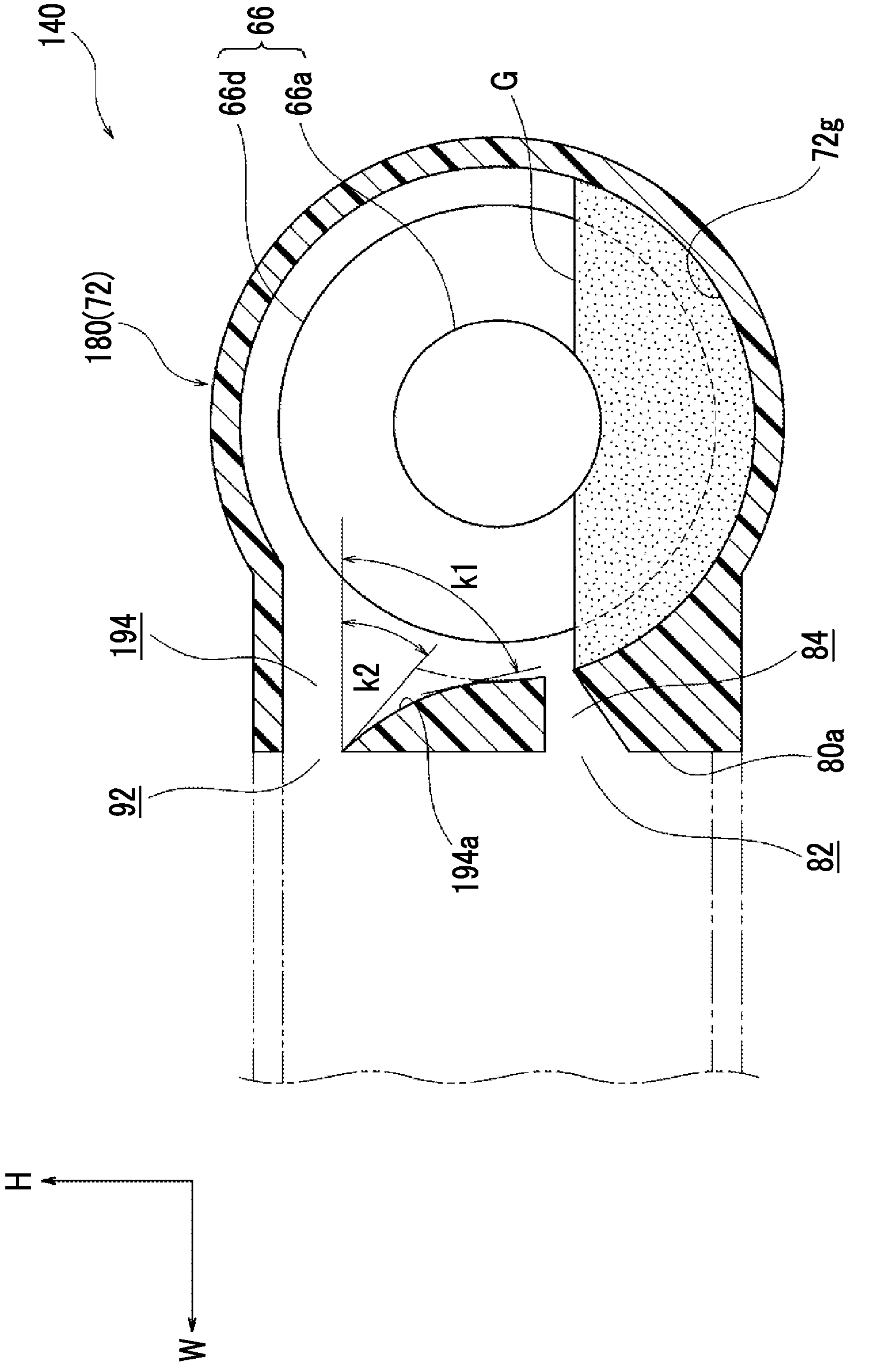
FIG. 8 is a cross-sectional view of an output path of a developing device according to a second exemplary embodiment of the present disclosure.

As illustrated in FIG. 8, the exhaust port 92 is formed on a wall portion 180 of the developing device 140 according to the second exemplary embodiment. Further, the wall portion 180 is formed with an exhaust path 194 that guides air from the inside of the housing 72 to the exhaust port 92. Further, the bottom surface 194*a* constituting the exhaust path 194 is inclined such that an inclination of the output path side portion of the output path 72*g* is steeper than an inclination of the exhaust port side portion of the output path 72*g*.

Specifically, an inclination angle of the output path side portion from the horizontal direction (K1 in FIG. 8) is larger than an inclination angle of the exhaust port side portion from the horizontal direction (K2 in FIG. 8). In the present exemplary embodiment, the inclination angle K2 is the same as an inclination angle of the bottom surface 94*a* (see FIG. 6) according to the first exemplary embodiment.

Further, the bottom surface 194*a* has an arcuate cross-section shape. Therefore, the inclination angle K gradually is increased from the exhaust port side portion toward the output path side portion.

SUMMARY

As described above, in the developing device 140 according to the second exemplary embodiment, the inclination of the output path side portion of the bottom surface 194*a* constituting the exhaust path 194 is steeper than the inclination of the exhaust port side portion. Therefore, most of the developer G on the bottom surface 194*a* is returned to the output path 72*g*, as compared with the case where the inclination angle of the bottom surface is constant with the inclination angle of the exhaust port side portion.

Although the specific exemplary embodiments of the present disclosure are described in detail, the exemplary embodiment of the present disclosure is not limited to such exemplary embodiments, and it is apparent to those skilled in the art that various other exemplary embodiments can be taken within the scope of the present disclosure. For example, in the exemplary embodiment described above, the output port 82 overlaps with the exhaust port 92 in the transport direction of the developer G, and the output port and the exhaust port may not overlap with each other. The exhaust port 92 may be provided on the wall portion 80 forming the output path 72*g*. Meanwhile, in this case, the action that the output port 82 overlaps with the exhaust port 92 is not obtained, in the transport direction of the developer G. Meanwhile, the difference between the pressure of the output path 72*g* and the pressure of the outside in the vicinity of the output port 82 is reduced, in the transport direction of the developer G, as compared with the case where the output port and the exhaust port are separated from each other.

Further, in the exemplary embodiment described above, the entirety of the output port 82 overlaps with the exhaust port 92 in the transport direction of the developer G, and at least parts of the output port and the exhaust port may overlap with each other, in the transport direction of the developer G. In this case, the action that the entirety of the output port 82 overlaps with the exhaust port 92 is not obtained, in the transport direction of the developer G.

Further, in the exemplary embodiment described above, in the transport direction of the developer G, the exhaust port 92 is provided with an extension portion on the downstream side with respect to the downstream end of the output port 82, and the exhaust port may not extend on the downstream side with respect to the downstream end of the output port. Meanwhile, in this case, the action that the exhaust port 92 is provided with the extension portion on the downstream side with respect to the downstream end of the output port 82 is not obtained.

Further, in the second exemplary embodiment described above, the bottom surface 194*a* has an arcuate cross-section shape, and the inclination angle is gradually increased from the exhaust port side portion toward the output path side portion, and the bottom surface may include a plurality of planes, and the inclination angle may be gradually increased from the exhaust port side portion toward the output path side portion.

Further, although not particularly described in the exemplary embodiment described above, the image forming apparatus 10 is provided with a recovery box for the developer G, and an opening of a duct connecting the recovery box and the developing devices 40 and 140 may cover the output port 82 and the exhaust port 92. As a result, the floating developer G exhausted from the exhaust port 92 is collected in the recovery box.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A developing device comprising:

a rotating member that passes a developer while rotating to an image holding body on which a latent image is formed;

a housing in which a circulation path through which the developer to be supplied to the rotating member circulates and a branch path that is branched from the circulation path and through which a part of the developer is transported are formed; and a wall portion that forms the branch path at a part of the housing and in which an output port from which the developer is output to an outside and an exhaust port from which air in the branch path is output to the outside above the output port are formed, wherein the output port and the exhaust port are located on a same surface of the wall portion and a same side of the housing.

2. The developing device according to claim 1, wherein at least parts of the output port and the exhaust port overlap with each other, in a transport direction of the developer transported in the branch path.

3. The developing device according to claim 2, wherein an entirety of the output port is overlapped with the exhaust port, in the transport direction.

4. The developing device according to claim 3 wherein the exhaust port is provided with an extending portion only on a downstream side with respect to a downstream end of the output port, in the transport direction.

5. The developing device according to claim 4, wherein an exhaust path through which air is guided from an inside of the housing to the exhaust port is formed at the wall portion, and a bottom surface of the exhaust path is inclined with respect to a horizontal direction such that an exhaust port side portion is located above a branch path side portion.

6. The developing device according to claim 5, wherein an inclination of the branch path side portion of the bottom surface is steeper than an inclination of the exhaust port side portion of the bottom surface.

7. An image forming apparatus comprising:

the developing device according to claim 5 that develops a latent image formed on an image holding body as a toner image; and a transfer device that transfers the toner image to a recording medium.

8. An image forming apparatus comprising:

the developing device according to claim 4 that develops a latent image formed on an image holding body as a toner image; and a transfer device that transfers the toner image to a recording medium.

9. The developing device according to claim 3, wherein an exhaust path through which air is guided from an inside of the housing to the exhaust port is formed at the wall portion, and a bottom surface of the exhaust path is inclined with respect to a horizontal direction such that an exhaust port side portion is located above a branch path side portion.

10. The developing device according to claim 9, wherein an inclination of the branch path side portion of the bottom surface is steeper than an inclination of the exhaust port side portion of the bottom surface.

11. An image forming apparatus comprising:

the developing device according to claim 9 that develops a latent image formed on an image holding body as a toner image; and a transfer device that transfers the toner image to a recording medium.

12. An image forming apparatus comprising:

the developing device according to claim 3 that develops a latent image, formed on an image holding body as a toner image; and a transfer device that transfers the toner image to a recording medium.

13. The developing device according to claim 2,
wherein an exhaust path through which air is guided from an inside of the housing to the exhaust port is formed at the wall portion, and
a bottom surface of the exhaust path is inclined with respect to a horizontal direction such that an exhaust port side portion is located above a branch path side portion.

14. The developing device according to claim 13,
wherein an inclination of the branch path side portion of the bottom surface is steeper than an inclination of the exhaust port side portion of the bottom surface.

15. An image forming apparatus comprising:
the developing device according to claim 13 that develops a latent image formed on an image holding body as a toner image; and
a transfer device that transfers the toner image to a recording medium.

16. An image forming apparatus comprising:
the developing device according to claim 2 that develops a latent image formed on an image holding body as a toner image; and
a transfer device that transfers the toner image to a recording medium.

17. The developing device according to claim 1,
wherein an exhaust path through which air is guided from an inside of the housing to the exhaust port is formed at the wall portion, and
a bottom surface of the exhaust path is inclined with respect to a horizontal direction such that an exhaust port side portion is located above a branch path side portion.

18. The developing device according to claim 17,
wherein an inclination of the branch path side portion of the bottom surface is steeper than an inclination of the exhaust port side portion of the bottom surface.

19. An image forming apparatus comprising:
the developing device according to claim 17 that develops a latent image formed on an image holding body as a toner image; and
a transfer device that transfers the toner image to a recording medium.

20. An image forming apparatus comprising:
the developing device according to claim 1 that develops a latent image formed on an image holding body as a toner image; and
a transfer device that transfers the toner image to a recording medium.

* * * * *